(12) United States Patent
Trachewsky (10) Patent No.: US 9,264,275 B2
(45) Date of Patent: *Feb. 16, 2016

(54) METHOD AND APPARATUS FOR WIDE BANDWIDTH MIXED-MODE WIRELESS COMMUNICATIONS

(71) Applicant: Broadcom Corporation, Irvine, CA (US)

(72) Inventor: Jason Alexander Trachewsky, Menlo Park, CA (US)

(73) Assignee: BROADCOM CORPORATION, Irvine, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/094,107

(22) Filed: Dec. 2, 2013

(65) Prior Publication Data

US 2014/0153487 A1 Jun. 5, 2014

Related U.S. Application Data

(63) Continuation of application No. 13/069,108, filed on Mar. 22, 2011, now Pat. No. 8,599,755, which is a continuation of application No. 12/553,281, filed on Sep. 3, 2009, now Pat. No. 7,912,024, which is a continuation of application No. 11/188,767, filed on Jul. 26, 2005, now Pat. No. 7,586,887.

(60) Provisional application No. 60/624,197, filed on Nov. 3, 2004, provisional application No. 60/591,097, filed on Jul. 27, 2004.

(51) Int. Cl.
*H04L 27/26* (2006.01)
*H04B 7/06* (2006.01)
*H04B 7/12* (2006.01)
*H04L 27/01* (2006.01)
*H04W 88/06* (2009.01)

(52) U.S. Cl.
CPC .......... *H04L 27/2634* (2013.01); *H04B 7/0697* (2013.01); *H04B 7/12* (2013.01); *H04L 27/01* (2013.01); *H04L 27/2618* (2013.01); *H04L 27/2601* (2013.01); *H04W 88/06* (2013.01)

(58) Field of Classification Search
CPC ...................................................... H04L 27/26
USPC ........................................ 370/328, 338, 334
See application file for complete search history.

(56) References Cited

U.S. PATENT DOCUMENTS 6,205,190 B1  3/2001  Antonio et al.
6,381,461 B1  4/2002  Besson et al.

(Continued)

FOREIGN PATENT DOCUMENTS

EP  1351414 A2  10/2003
WO  WO 01/95579 A2  12/2001

OTHER PUBLICATIONS

Search Report from European Patent Application No. 05016005.0, dated Oct. 28, 2005.

*Primary Examiner* — Michael T Vu
(74) *Attorney, Agent, or Firm* — Sterne, Kessler, Goldstein & Fox P.L.L.C.

(57) ABSTRACT

A network device for implementing high-rate greenfield transmission in a mixed mode frame structure. The network device is configured to transmit a mixed mode frame on two adjacent channels. The mixed mode frame comprises at least two backward compatible portions of a first frequency and a greenfield portion of a second frequency.

20 Claims, 5 Drawing Sheets

(56) References Cited

U.S. PATENT DOCUMENTS

| | | |
|---|---|---|
| 7,586,887 B2 | 9/2009 | Trachewsky |
| 7,912,024 B2 | 3/2011 | Trachewsky |
| 8,599,755 B2 | 12/2013 | Trachewsky |
| 2002/0193146 A1 | 12/2002 | Wallace et al. |
| 2005/0118964 A1 | 6/2005 | Johnston |
| 2005/0135318 A1 | 6/2005 | Walton et al. |
| 2005/0286474 A1* | 12/2005 | van Zelst et al. .............. 370/334 |
| 2006/0002361 A1 | 1/2006 | Webster et al. |
| 2006/0018249 A1 | 1/2006 | Shearer et al. |
| 2006/0092892 A1 | 5/2006 | Trachewsky |
| 2010/0014498 A1 | 1/2010 | Trachewsky |

* cited by examiner

METHOD AND APPARATUS FOR WIDE BANDWIDTH MIXED-MODE WIRELESS COMMUNICATIONS

This application is a continuation of U.S. patent application Ser. No. 13/069,108, filed Mar. 22, 2011, assigned U.S. Pat. No. 8,599,755, which is a continuation of U.S. patent application Ser. No. 12/553,281, filed Sep. 3, 2009, now U.S. Pat. No. 7,912,024, which is a continuation of U.S. patent application Ser. No. 11/188,767, filed Jul. 26, 2005, now U.S. Pat. No. 7,586,887, which claims the benefit of both U.S. Provisional Application No. 60/591,097, filed on Jul. 27, 2004, and U.S. provisional Application No. 60/624,197, filed on Nov. 3, 2004, the entire contents of which are hereby incorporated by reference.

BACKGROUND OF THE INVENTION

1. Field of the Invention

The present invention relates generally to wireless communication systems and more particularly to a system for enabling mixed mode wireless communications by forward and backward compatible systems.

2. Description of the Related Art

Wireless communications systems enable various types of communications. One type of wireless communication between a single transmitter and a single receiver is known as a single-output-single-input (SISO) communication. The transmitter includes one antenna for transmitting radiofrequency (RF) signals, which are received by one or more antennae of the receiver. When the receiver includes two or more antennae, the receiver selects one of antennae to receive the incoming RF signals. Another type of wireless communications is a multiple-input-multiple-output (MIMO) communication. In a MIMO wireless communication, the transmitter and the receiver each includes multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Different wireless devices in a wireless communication system may be compliant with different standards or different variations of the same standard. For example, IEEE™ 802.12a, an extension of the IEEE™ 802.11 standard, provides up to 54 Mbps in the 5 GHz band. IEEE™ 802.12c, another extension of the 802.11 standard, provides 11 Mbps transmission (with a fallback to 5.5, 2 and 1 Mbps) in the 2.4 GHz band. IEEE™ 802.11g, another extension of the 802.11 standard, provides 20+ Mbps in the 2.4 GHz band. IEEE™ 802.11n, a new extension of 802.11, is being developed to address, among other things, higher throughput and compatibility issues. An 802.12a compliant communications device may reside in the same WLAN as a device that is compliant with another 802.11 standard. When devices that are compliant with multiple versions of the 802.11 standard are in the same WLAN, the devices that are compliant with older versions are considered to be legacy devices. To ensure backward compatibility with legacy devices, specific mechanisms must be employed to insure that the legacy devices know when a device that is compliant with a newer version of the standard is using a wireless channel to avoid a collision. New implementations of wireless communication protocol enable higher speed throughput, while also enabling legacy devices which might be only compliant with 802.12a or 802.11g to communicate in systems which are operating at higher speeds.

To address the compliance issue, current communications systems support mixed-mode frames for two or more transmit antennae. The mixed mode frame includes information that can be used by legacy devices and information that is specific to non-legacy devices. Specifically, the mixed mode frame includes a preamble that includes a backward compatible portion and a greenfield portion. The backward compatible portion is used by a legacy device to determine how long to stay off the channel due to transmission of the greenfield portion which is ignored by the legacy device but used by a non-legacy device.

There is a need, however, for packets or frames to be transmitted to devices at higher rates, where possible, and also be compliant with legacy devices.

SUMMARY OF THE INVENTION

According to one aspect of the invention, there is provided a network device for implementing high-rate greenfield transmission in a mixed mode frame structure. The network device is configured to transmit a mixed mode frame on two adjacent channels. The mixed mode frame comprises at least two backward compatible portions of a first frequency and a greenfield portion of a second frequency.

According to another aspect of the invention, there is provided a network device for receiving a high-rate greenfield transmission in a mixed mode frame structure. The network device includes a detector for detecting at least one of two parallel transmissions of a first frequency and a greenfield transmission of a second frequency.

According to another aspect of the invention, there is provided a network device for transmitting a high-rate greenfield transmission in a mixed mode frame structure. The network device includes a generator for a backward compatible portion that generates a plurality of backward compatible portions of a first frequency and provides a length and rate combination such that a legacy device will stay off a channel for a length of a greenfield transmission. The network device also includes a generator for a greenfield portion that generates a greenfield portion of a second frequency, passes a dummy length and dummy rate to the generator for a backward compatible portion and instructs the generator for a backward compatible portion to provide the length and rate combination and thereby ensure backward compatibility with legacy devices. The network device further includes means for multiplexing outputs from the generator for a backward compatible portion and the generator for a greenfield portion into a plurality of symbol mappers that correspond to a number of transmit antennae in device. The network device also includes a plurality of processing modules for processing the mixed mode frame and transmitting the mixed mode frame on two adjacent channels that can be received independently by legacy stations, wherein the mixed mode frame includes two mixed mode backward compatible portions of a first frequency and a greenfield portion of a second frequency.

According to another aspect of the invention, there is provided a method for transmitting a high-rate greenfield transmission in a mixed mode frame structure. The method includes the steps of generating a plurality of backward compatible portions of a first frequency and generating a greenfield portion of a second frequency. The method also includes the step of passing a dummy length and dummy rate to a generator for a backward compatible portion and instructing the generator for a backward compatible portion to provide a length and rate combination. The method further includes the steps of providing the length and rate combination such that a legacy device will stay off a channel for a length of a greenfield transmission and multiplexing the plurality of backward compatible portions and the greenfield portion into a plurality of symbol mappers that correspond to a number of transmit antennae in device. The method also includes the step of transmitting a mixed mode frame on two adjacent channels that can be received independently by legacy station. The frame includes two backward compatible portions of a first frequency and a greenfield portion of a second frequency.

According to another aspect of the invention, there is provided an apparatus for transmitting a high-rate greenfield transmission in a mixed mode frame structure. The apparatus includes a first generating means for generating a plurality of backward compatible portions of a first frequency and a second generating means for generating a greenfield portion of a second frequency. The apparatus also includes passing means for passing a dummy length and dummy rate to a generator for a backward compatible portion and instructing the generator for a backward compatible portion to provide a length and rate combination. The apparatus further includes providing means for providing the length and rate combination such that a legacy device will stay off a channel for a length of a greenfield transmission and multiplexing means for multiplexing the plurality of backward compatible portions and the greenfield portion into a plurality of symbol mappers that correspond to a number of transmit antennae in device. The apparatus also includes transmitting means for transmitting a mixed mode frame on two adjacent channels that can be received independently by legacy stations, wherein the mixed mode frame includes two backward compatible portions of a first frequency and a greenfield portion of a second frequency.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF THE INVENTION

Reference will now be made to the preferred embodiments of the present invention, examples of which are illustrated in the accompanying drawings.

Figure 1:
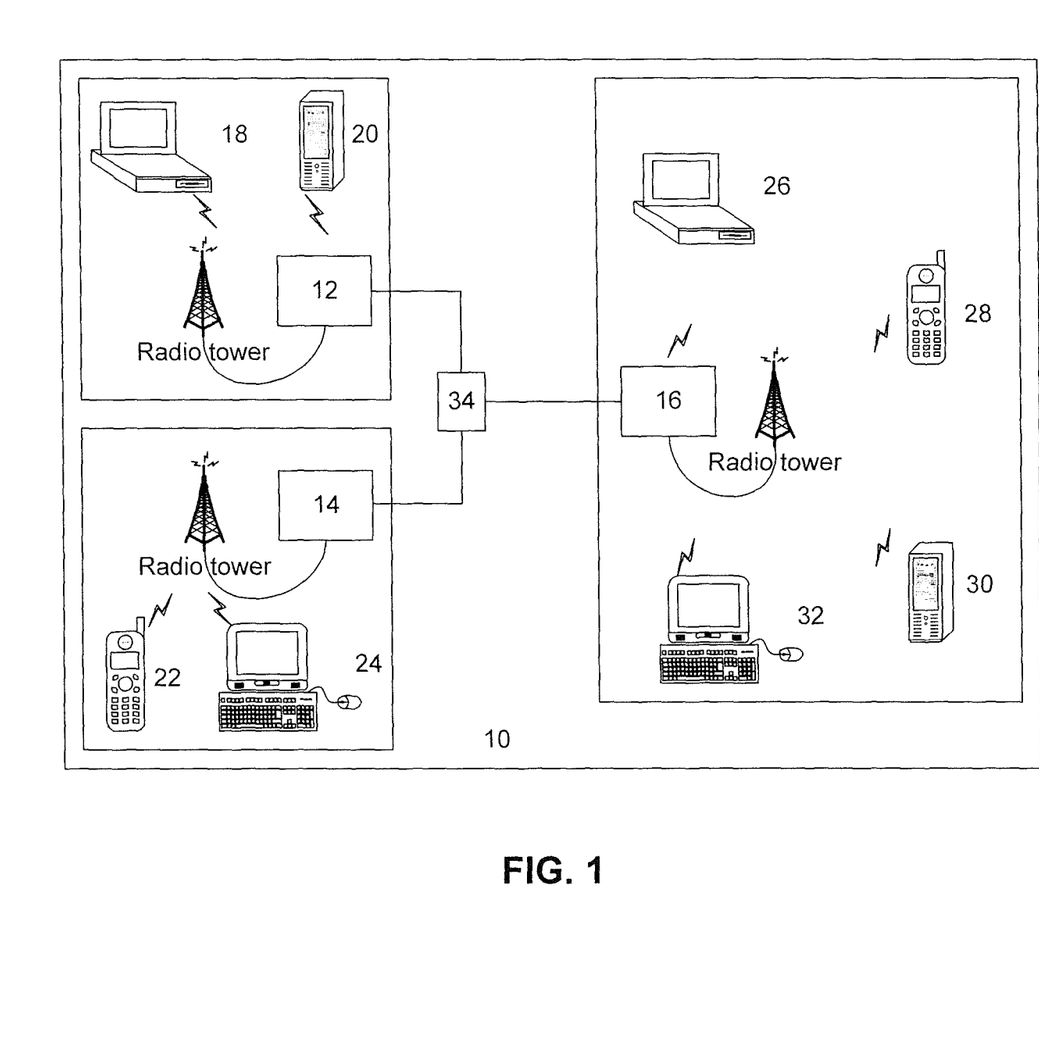
FIG. 1 illustrates a communication system 10 that may be used to implement one embodiment of the invention.

FIG. 1 illustrates a communication system 10 that includes a plurality of base stations and/or access points 12-16, a plurality of wireless communication devices 18-32 and a network hardware component 34. Wireless communication devices 18-32 may be laptop computers 18 and 26, personal digital assistant hosts 20 and 30, personal computer 24 and 32 and/or cellular telephone 22 and 28. Base stations or access points 12-16 are operably coupled to network hardware 34 via local area network connections 36, 38 and 40. Network hardware 34, for example a router, a switch, a bridge, a modem, or a system controller, provides a wide area network connection for communication system 10. Each of base stations or access points 12-16 has an associated antenna or antenna array to communicate with the wireless communication devices in its area. Typically, the wireless communication devices register with a particular base station or access point 12-14 to receive services from communication system 10. Each wireless communication device includes a built-in radio or is coupled to an associated radio. The radio includes at least one radiofrequency (RF) transmitter and at least one RF receiver.

Each wireless communication device participating in wireless communications includes a built-in radio transceiver (i.e., receiver and transmitter) or is coupled to an associated radio transceiver. As is known to those skilled in the art, the transmitter typically includes a data modulation stage, one or more intermediate frequency stages, and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

The receiver is typically coupled to the antenna and includes a low noise amplifier, one or more intermediate frequency stages, a filtering stage, and a data recovery stage. The low noise amplifier receives, via the antenna, inbound RF signals and amplifies the inbound RF signals. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with a particular wireless communication standard.

Communications systems may support mixed mode frames on two or more transmit antenna to address compliance issue with legacy and non legacy systems. In communications systems that support mixed-mode frames with backward compatible and greenfield portions, medium access (MAC) mechanisms may be used to instruct the legacy devices to stay of the channels during transmission of a greenfield portion. However, the legacy devices may not always see the MAC information. As such, during transmission of a mixed-mode frame, it is preferable to protect the transmission of the greenfield portion with a physical layer protection scheme. That way, even if the legacy devices do not see the MAC information, the mixed-mode preamble provides the necessary instructions to the legacy devices.

Figure 2A:
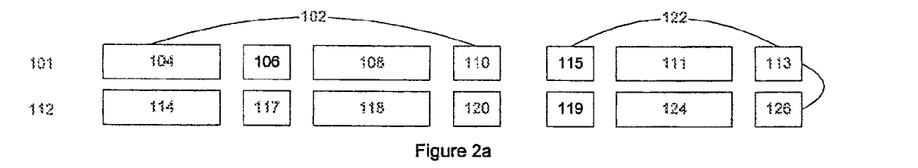
FIG. 2a illustrates a 20 MHz mixed-mode frame for two transmit antennae.
Figure 2B:
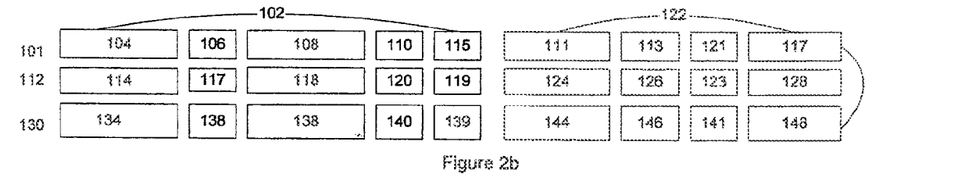
FIG. 2b illustrates a 20 MHz mixed-mode frame for three transmit antennae.
Figure 2C:
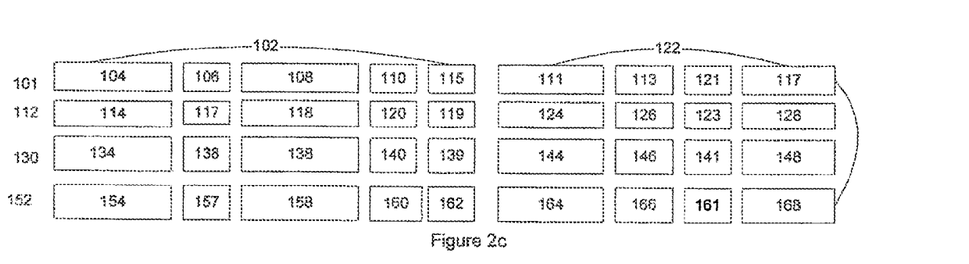
FIG. 2c illustrates a 20 MHz mixed mode frame for four transmit antennae.

FIGS. 2a-2c each illustrates a 20 MHz mixed-mode frame for multiple transmit antennae in a MIMO communication. FIG. 2a illustrates a 20 MHz mixed-mode frame for two transmit antennae; FIG. 2b illustrates a 20 MHz mixed-mode frame for three transmit antennae; and FIG. 2c illustrates a 20 MHz mixed mode frame for four transmit antenna. According to FIGS. 2a-2c, a backward compatible portion 102 includes a short symbol 104/114/134/154, which is followed by a guard interval 106/117/128/157, a long training sequence 108/118/138/158 and a predefined SIGNAL field 110/120/140/160. Greenfield portion 122 includes a one or more long training sequences 111/124/144/164 and 117/128/148/168, a guard interval 121/123/141/161 and a SIGNAL field 113/

126/146/166. In FIGS. 2b and 2c, backward compatible portion 102 includes guard interval 115/119/139/162 and greenfield portion 122 includes guard interval 115/121 in FIG. 2a.

On first transmitter 101 in FIGS. 2a-2c, the preamble is transmitted in the same manner as a transmission on 802.12a/802.11g. On the second transmitter 112, short training symbol 114 is transmitted with a cyclic shift of 400 ns, long training sequence 118 is transmitted with a cyclic advance 100 ns and SIGNAL field 120 is transmitted with a cyclic advance of 100 ns. Guard interval 117 is transmitted with no cyclic shift and guard interval 119 is transmitted with a cyclic shift of 2. In greenfield portion 122, long training sequences 124/128 and SIGNAL field 126 are transmitted with a cyclic shift of 1600 ns. Guard interval 123 is transmitted with a cyclic shift of 2. According to FIG. 2b-2c on the third transmit antenna 130, short training symbol 134 is transmitted with a cyclic shift of 400 ns, long training sequence 138 is transmitted with a cyclic shift of 100 ns and SIGNAL field 140 is transmitted with a cyclic shift of 100 ns. Guard intervals 138 and 139 are transmitted with a cyclic shift of 1. In greenfield portion 122, long training sequences 144/148 and SIGNAL field 146 are transmitted with a cyclic shift of 100 ns. Guard interval 141 is transmitted with a cyclic shift of 1. According to FIG. 2c on the forth transmit antenna 150, short training symbol 154 is transmitted with a cyclic shift of 400 ns, long training sequence 158 and SIGNAL field 160 are transmitted with a cyclic shift of 200 ns. Guard interval 157 is transmitted with a cyclic shift of 2 and guard interval 162 is transmitted with a cyclic shift of 1. In greenfield portion 122, long training sequences 164/168 and SIGNAL field 166 are transmitted with a cyclic shift of 1700 ns. Guard interval 161 is transmitted with a cyclic shift of 4.

In any of the illustrations of FIGS. 2a-2c, when a legacy device receives the backward compatible portion, it uses the short training symbol to detect the frame, the long training sequence to train the equalizer, and the SIGNAL field to know how long to stay of the channel for transmission of the greenfield portion.

The present invention provides a method for transmitting greenfield information at a higher rate than the 20 MHz that is currently used, while remaining compliant with legacy devices. Specifically, the present invention provides a mixed mode 40 MHz frame structure for a greenfield 40 MHz transmission.

Figure 3:
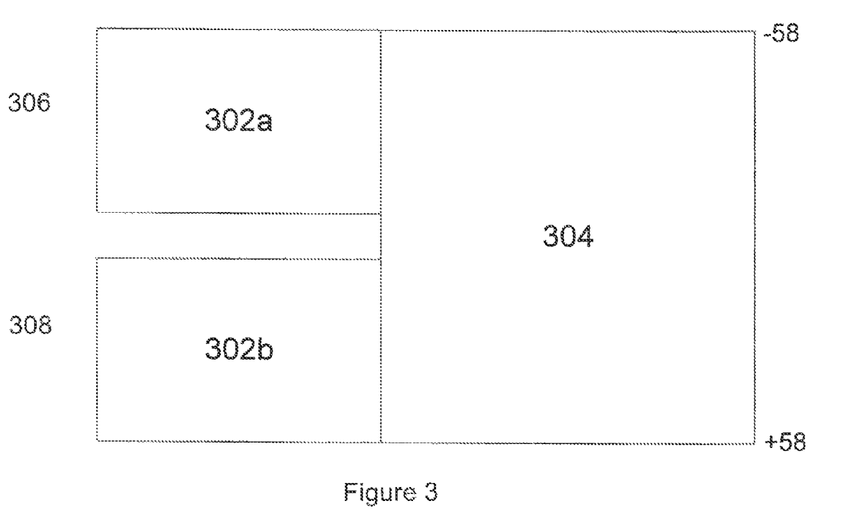
FIG. 3 illustrates an embodiment of an inventive mixed mode 40 MHz frame structure.

FIG. 3 illustrates an embodiment of the inventive mixed mode 40 MHz frame structure. The inventive systems can use, in this example, two adjacent 20 MHz channels 306 and 308 that can be received independently by 20 MHz legacy devices to simultaneously transmit the 40 MHz frame. The 40 MHz frame structure of FIG. 3 may be used for 5 GHz or 2.4 GHz. As is known to those skilled in the art, in standards such as IEEE™ 802.12b and 802.11g, the channels are 5 MHz wide, even though the signal expands beyond 5 MHz. In such an embodiment, channel 306 represents channel 4n+k and channel 308 represents 4(n+1)+k, where n is the number of transmit antennae and k may be any integer from 0 to 3 but is typically equal to 0 for all frequency except 5745 to 5825 MHz and 1 for frequencies between 5745 and 5805 MHz. In IEEE™ 802.12a, the channels are also 5 MHz wide; however, there are certain boundaries that must be observed in 802.12a. In this embodiment, channel 306 represents channel n and channel 308 represents n+4. As such, the mixed mode frame structure of FIG. 3 may be used in 802.12b, 802.11g and 802.12a environments. The timing and antenna mapping of the present invention may be identical to that of 20 MHz mixed mode frame format.

In FIG. 3, the frame includes two 20 MHz mixed mode preambles 302a/1302b and a 40 MHz greenfield portion 304. Duplicate copies of the same 20 MHz backward compatible portion are sent on each of channels 306 and 308. 40 MHz greenfield portion 304 includes preamble information and data. As is known to those skilled in the art, greenfield portion 304 needs to be received by only non-legacy devices. In greenfield portion 304, a very high rate with good frequency diversity is achievable. It should be noted that greenfield portion 304 is not necessarily exactly the same as two greenfield 20 MHz transmission separated by 2 by 10 MHz.

When receivers on channels 306 and 308 receive the 40 MHz frame, the receivers use the SIGNAL field in backward compatible portion 302a and 302b of the mixed-mode 40 MHz preamble to determine how long to stay off the channel because of transmission of greenfield portion 304. Specifically, referring to FIGS. 2a-2c, SIGNAL field 110/112/140/160 encodes the actual frame duration with dummy length and rate fields. The transition to the legacy stations can likely decode the signal field in either channel 306 and 308. The greenfield 40 MHz transmission starts after SIGNAL field 110/112/140/160 and long training burst.

Figure 4:
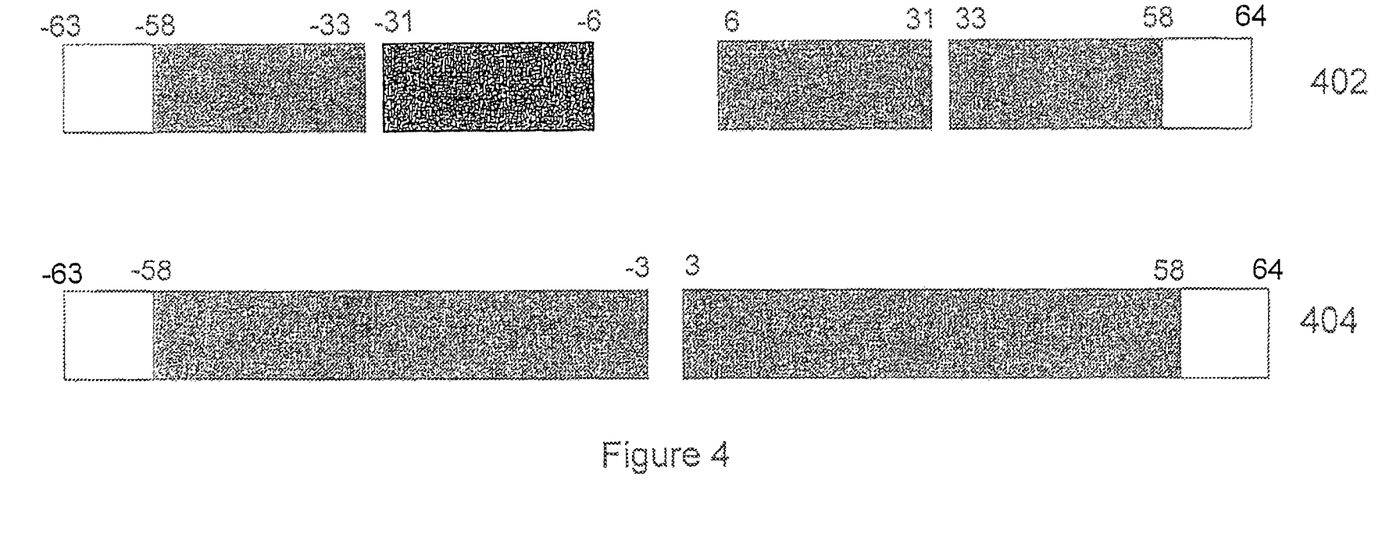
FIG. 4 illustrates sub-carrier maps used in one embodiment of the inventive system.

FIG. 4 illustrates sub-carrier maps 402 and 404 used in the inventive system. Devices implementing both the 802.12a and 802.11g standards use an orthogonal frequency division multiplexing (OFDM) encoding scheme. OFDM is a frequency division multiplexing modulation technique for transmitting large amounts of digital data over a radio wave. OFDM works by spreading a single data stream over a band of sub-carriers, each of which is transmitted in parallel. In 802.12a and 802.11g compliant devices, only 52 of the 64 active sub-carriers are used. Four of the active sub-carriers are pilot sub-carriers that the system uses as a reference to disregard frequency or phase shifts of the signal during transmission. The remaining 48 sub-carriers provide separate wireless pathways for sending information in a parallel fashion. The 52 sub-carriers are modulated using binary or quadrature phase shift keying (BPSK/QPSK), 16 Quadrature Amplitude Modulation (QAM), or 64 QAM. Therefore, 802.12a and 802.11g compliant devices use sub-carriers −26 to +26, with the 0-index sub-carrier set to 0 and 0-index sub-carrier being the carrier frequency.

Since the present invention uses double bandwidth, FIG. 4 illustrates sub-carriers −64 to +63. Each of the sub-carriers −58 to −6 and 6 to 58 in map 402 are the 52 sub-carriers that are used in 802.12a/802.11g devices. The sub-carriers are centered exactly on 20 MHz channel boundaries so that they are each receivable by legacy 802.12a/802.11g stations. As noted above, duplicate copies of the same 20 MHz backward compatible portion are sent on channels 306 and 308. Greenfield portion sub-carrier map 404 illustrates information on sub-carriers −58 to −3 and 3 to 58. However, extra pilots may also be place on sub-carriers −2, −1, +1 and +2. In the present invention, the power increases by less than 0.65 dB at the transition from the backward compatible portion to the greenfield portion on a flat channel. To reduce the power increase, up to 4 dummy sub-carriers, bearing no information between indices −6 and +6 in the mixed mode portion may be filled. Since these extra sub-carriers are encoded using the same 128 point Inverse Fast Fourier transform, they are orthogonal to the other sub-carriers and do not affect decoding of the other sub-carriers by the legacy receivers. It should be noted that greenfield portion 304 on channels 306 and 308 is separated by 9.0625 MHz and the zero (DC) subcarrier is removed/skipped. Different information is transmitted on the upper and lower blocks of the subcarriers, the output of one interleaver. Up to four extra pilots may be inserted near the DC for phase/frequency tracking at the receiver.

The 40 MHz receiver in non-legacy stations needs to have a detector for either two parallel 20 MHz legacy transmissions or a greenfield 40 MHz transmission. The complexity of such a detector is small compared with other contemplated functions, such as advanced coding.

Figure 5:
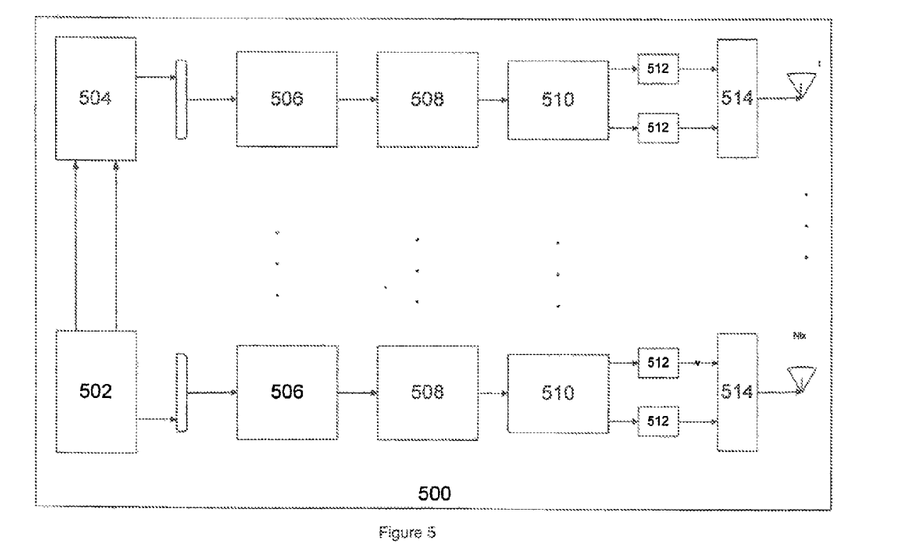
FIG. 5 illustrates a block diagram of a device that is used to transmit the 40 MHz mixed mode frame.

FIG. 5 illustrates a block diagram of one example of a device that is used to transmit the 40 MHz frame. System 500 includes a generator for greenfield portion 502, a generator for backward compatible portion 504, multiple symbol mappers 506, multiple 128 point Inverse Fast Fourier transform (IFFT) modules 508, multiple digital filters 510, and digital to analog converters (D/A) 512. Data bits enter generator for the greenfield portion 502 which passes a dummy length and dummy rate to generator for the backward compatible portion 504 and instructs generator for the backward compatible portion 504 to provide a length and rate combination such that the legacy device will stay off the channel for the length of the greenfield portion transmission. Generator for the backward compatible portion 504 uses a SIGNAL symbol in the backward compatible portion to encode the actual frame duration with the dummy length and rate field and make the present invention backward compatible with other 802.11 devices. Each of the outputs from generators 502 and 504 are multiplexed into symbol mappers 506 corresponding to the number of transmit antennae in device 500. Each of symbol mappers 506 generates symbols from the coded bits for each of the sub-carriers of an OFDM sequence. Each Inverse Fourier Transform 508 converts the sub-carriers from the frequency domain to the time domain. The signals are subsequently filtered by digital filter modules 510 and converted to analog signals via D/As 512. The analog signals can be transmitted to transmit antennae 1 to N via module 514.

It should be appreciated by one skilled in art, that although examples of the present invention are described with respect to IEEE™ 802.11a and 802.11g, the inventive method may be utilized in any device that implements the OFDM encoding scheme. The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communication device, comprising:
   a backward compatible portion generator configured to:
      generate a backward compatible portion of a mixed mode frame, and
      generate a copy of the backward compatible portion; and
   a greenfield generator configured to:
      generate a greenfield portion of the mixed mode frame, and
      generate a dummy length and a dummy rate for the backward compatible portion and the copy of the backward compatible portion based on the greenfield portion.

2. The communication device of claim 1, wherein the backward compatible portion comprises a field containing timing information to instruct a receiver to ignore transmissions for a predetermined period of time.

3. The communication device of claim 2, wherein the field containing the timing information is a signal field.

4. The communication device of claim 1, wherein the backward compatible portion comprises:
   a short training symbol;
   a guard interval; and
   a long training sequence.

5. The communication device of claim 4, wherein the short training symbol is configured to be used by a receiver to detect the mixed mode frame.

6. The communication device of claim 4, wherein the long training sequence is configured to be used by a receiver to train an equalizer.

7. The communication device of claim 1, wherein the greenfield portion comprises:
   a signal field;
   a guard interval; and
   a long training sequence.

8. The communication device of claim 1, wherein the greenfield generator is configured to use a transmission length of the greenfield portion to generate the dummy length and the dummy rate for the backward compatible portion and the copy of the backward compatible portion.

9. The communication device of claim 1, further comprising:
   a symbol mapper coupled to the backward compatible portion generator, wherein the symbol mapper is configured to generate a symbol from coded bits for sub-carriers of an orthogonal frequency-division multiplexing (OFDM) sequence.

10. The communication device of claim 1, further comprising:
    an Inverse Fast Fourier Transform (IFFT) module; and
    a digital filter.

11. The communication device of claim 1, further comprising:
    a transmitter configured to transmit the backward compatible portion, the copy of the backward compatible portion, and the greenfield portion.

12. The communication device of claim 11, wherein the transmitter is configured to:
    transmit the backward compatible portion at a first frequency over a first channel;
    transmit the copy of the backward compatible portion at the first frequency over a second channel; and
    transmit the greenfield portion at a second frequency.

13. The communication device of claim 12, wherein the second channel is adjacent to the first channel.

14. The communication device of claim 1, wherein the greenfield generator is further configured to:
    instruct the backward compatible portion generator to generate the backward compatible portion such that a legacy device will stay off a channel for a length of a transmission of the greenfield portion.

15. A communication device, comprising:
    a backward compatible portion generator configured to:
       generate a backward compatible portion of a mixed mode frame based on a dummy length and a dummy rate, wherein the backward compatible portion contains timing information to instruct a receiver to ignore a transmission of a greenfield portion of the mixed mode frame, and
       generate a copy of the backward compatible portion; and
    a transmitter configured to:
       transmit the backward compatible portion over a first channel,
       transmit the copy of the backward compatible portion over a second channel, and
       transmit the greenfield portion.

16. The communication device of claim 15, wherein the second channel is adjacent to the first channel.

17. The communication device of claim 15, further comprising:
- a greenfield portion generator configured to:
  - generate the greenfield portion,
  - generate the dummy length and the dummy rate, and
  - provide the dummy length and the dummy rate to the backward compatible portion generator.

18. A method, comprising:
- generating, using a first communication device, a backward compatible portion of a mixed mode frame based on a dummy length and a dummy rate, wherein the backward compatible portion contains timing information to instruct a second communication device to ignore a transmission of a greenfield portion of the mixed mode frame;
- transmitting, using the first communication device, the backward compatible portion over a first channel;
- transmitting, using the first communication device, the copy of the backward compatible portion over a second channel; and
- transmitting, using the first communication device, the greenfield portion of the mixed mode frame.

19. The method of claim 18, wherein the second channel is adjacent to the first channel.

20. The method of claim 18, further comprising:
- generating the greenfield portion; and
- generating the dummy length and the dummy rate based on the greenfield portion.

\* \* \* \* \*